UNITED STATES PATENT OFFICE.

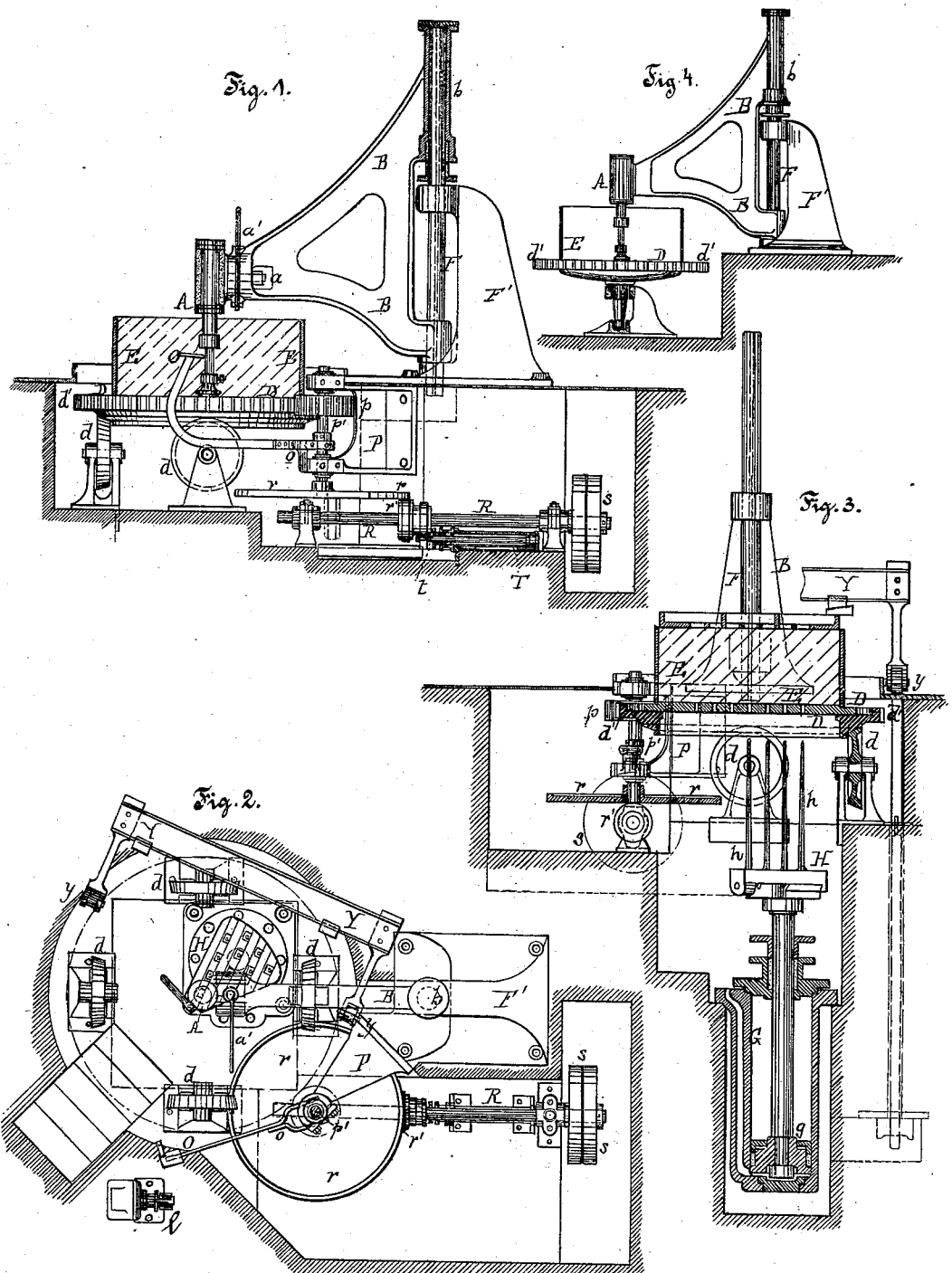

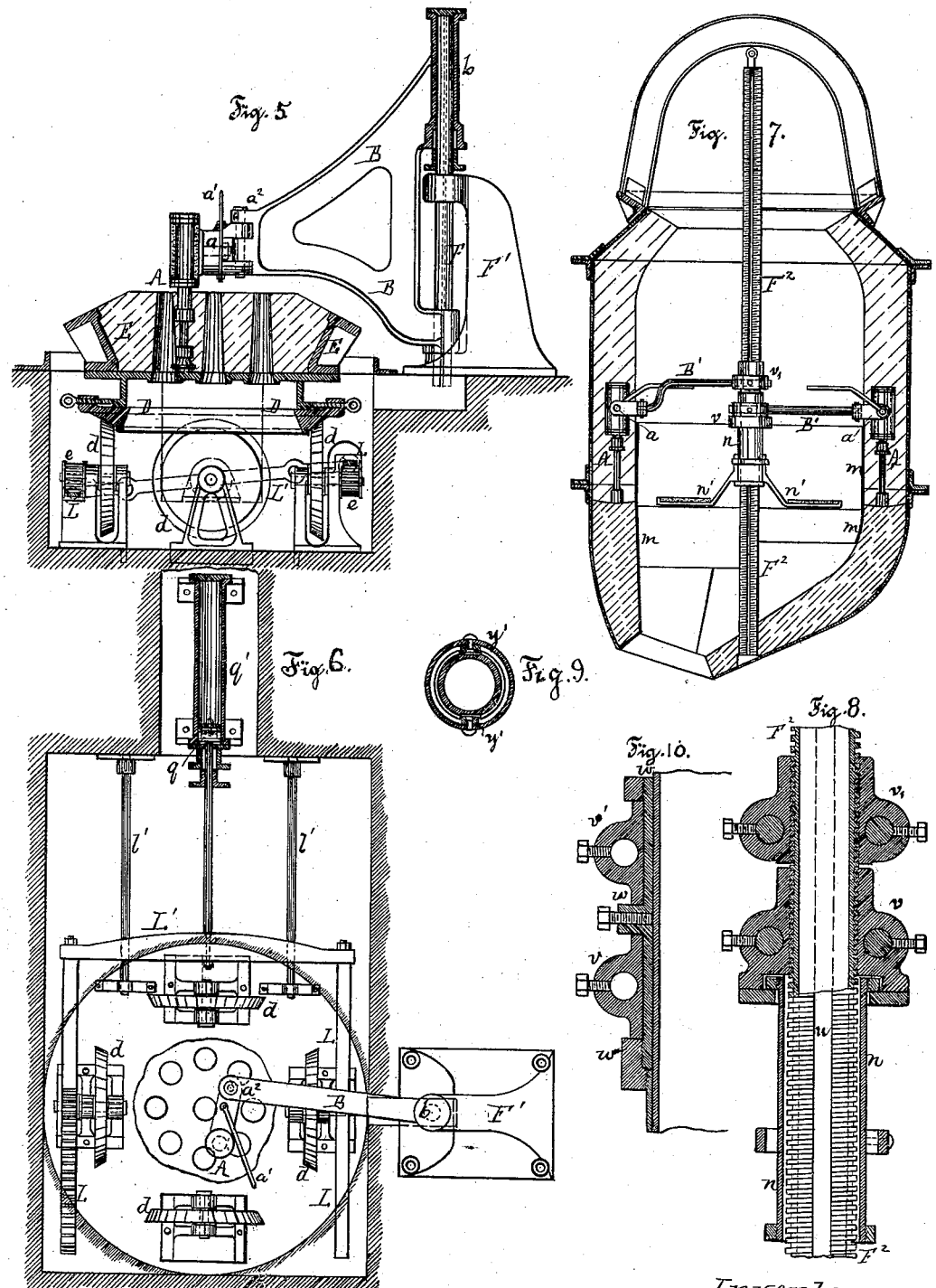

BRUNO VERSEN, OF DORTMUND, WESTPHALIA, GERMANY.

APPARATUS FOR LINING CONVERTERS AND CONVERTER-BOTTOMS.

SPECIFICATION forming part of Letters Patent No. 375,965, dated January 3, 1888.

Application filed April 14, 1886. Serial No. 198,874. (No model.) Patented in Germany April 23, 1884, No. 30,634; in France August 2, 1884, No. 163,610; in England September 17, 1885, No. 11,030; in Austria-Hungary October 19, 1885, No. 27,316; in Luxemburg July 1, 1886, No. 708, and in Belgium July 15, 1886, No. 73,687.

*To all whom it may concern:*

Be it known that I, BRUNO VERSEN, a subject of the Emperor of Germany, and a resident of Dortmund, Westphalia, Germany, have invented an Improved Apparatus for Lining Converters and Converter-Bottoms, (for which I have obtained a British patent, No. 11,030, dated September 17, 1885; French patent, No. 163,610, dated August 2, 1884; German patent, No. 30,634, dated April 23, 1884; Belgian patent, No. 73,687, dated July 15, 1886; Luxemburg patent, No. 708, dated July 1, 1886, and Austro-Hungarian patent, No. 27,316, dated October 19, 1885,) of which the following is a specification.

My invention consists of an apparatus for forming the fire-proof linings for converters and converter-bottoms, so that these linings will be more regular, firmer, and consequently more durable than when produced by hand in the ordinary way.

My apparatus is applicable to the formation of linings either for the Bessemer process or the basic process; but it is especially useful in lining converters for the latter.

In the accompanying drawings, Figure 1 is a side view, partly in section, of one form of my apparatus for lining the bottoms of converters. Fig. 2 is a plan view showing the groundwork in section and with the converter-bottom and its rotary carrying-table removed. Fig. 3 is a vertical section at about right angles to that of Fig. 1, and showing the apparatus for forming the necessary holes in the bottom of the converter. Fig. 4 is a view of a modification. Fig. 5, Sheet 2, is a vertical section of another form of my apparatus adapted for lining the bottoms of converters provided with tuyeres. Fig. 6 is a sectional plan view of the same, the converter-bottom and its carrying-table being broken away to illustrate more fully the details. Fig. 7 is a vertical section showing my apparatus for lining the body of the converter. Fig. 8 is a vertical section, drawn to an enlarged scale, of a portion of the apparatus. Fig. 9 is a sectional plan, and Fig. 10 is a vertical section, drawn to an enlarged scale, of a modification.

My apparatus consists, essentially, of a reciprocating ramming-tool, A, carried by a swinging crane or arm, B, which can be adjusted vertically on its supports, and in the constructions shown in Figs. 1, 2, 3, 4, 5, and 6 this adjustable reciprocating rammer is combined with a rotary table, D, carrying the converter-bottom E to be lined.

In the modifications shown in Figs. 1, 2, and 3 the rotary table is mounted on four rollers, $d$, mounted to turn in bearings in a suitable pit below the level of the ground, for I prefer to have the table at about a level with the ground, and rotary motion may be imparted to this table by means of a pinion, $p$, gearing into a crown-wheel, $d'$, on the periphery of the table D. This pinion $p$ is carried by a spindle, $p'$, mounted in bearings in a bracket, P, secured to the foundation, this spindle being mounted in its bearings in such a manner that it can have a slight longitudinal movement therein, and at the same time be free to turn. The spindle $p'$ carries at its lower end a horizontal friction-disk, $r$, normally in contact with a friction-disk, $r'$, connected by a groove and feather to a horizontal driving-shaft, R, so that while it is free to be moved longitudinally on the latter it must turn therewith. This horizontal driving-shaft is provided at its outer end, as shown in Figs. 1 and 2, with fast and loose pulleys $s$.

Adjacent to or immediately underneath the shaft R is a hydraulic or compressed-air cylinder, T, the piston-rod $t$ of which controls the longitudinal movement of the friction-disk $r'$ on its shaft R, so that by causing this piston to move longitudinally in its cylinder the friction-disk $r$ will be moved radially over the face of the disk $r'$, to thereby vary the speed at which the rotary table D is driven.

A pivoted treadle-lever, O, having the treadle end projecting above the level of the ground at the side of the apparatus, is pivoted at $o$ to a suitable bracket, and has its outer end bearing against the under side of a collar on the spindle $p'$, so that by pressing on this treadle-lever the spindle $p'$ and disk $r$ can be at any time raised out of contact with the friction-disk $r'$, and the rotary movement of the table D therefore stopped at once.

The reciprocating ramming or tamping tool A may be driven by steam, compressed air, or hydraulic power in any convenient way, and in the construction shown in Figs. 1, 2, 3, and 4 this reciprocating tamping-tool is connected to the swinging crane B by means of a horizontal pivot, $a$, so that it can be swung on the latter, and the cylinder is provided with a suitable handle, $a'$, which can be grasped by the operator, so that he can thereby swing the rammer on its pivot $a$, and at the same time control the swinging movement of the crane B on the vertical carrying-shaft F, mounted in the foundation-frame F'.

The upper bearing, $b$, of the bracket on the shaft F is in the form of a closed cylinder, in which the spindle may work, and the latter is perforated throughout its length, and is connected with a steam or hydraulic supply-pipe, so that, the shaft F being fixed in the foundation, the admission of steam or other motive fluid through the tubular shaft will cause the bracket and the tamping-tool to be raised clear of the table and the converter-bottom carried by it whenever desired. The admission of steam or hydraulic pressure to this cylinder $b$ and the cylinder T may be controlled from one valve or regulating mechanism, $l$, as indicated in the plan view, Fig. 2, and this is arranged close at the left hand of the operator, while with his right hand he controls the movements and positions of the tamping-tool, and with his foot he can stop or start the rotating movement of the table D and the converter-bottom carried by it.

When the apparatus is in use, and as the material is poured into the bottom, the reciprocating tamping-tool is put in operation, and it is traversed from the margin to the center, backward and forward in concentric circles as the table rotates, so that the lining is regularly and firmly tamped.

In the construction shown in Fig. 4 the rotary table, instead of being mounted on four rollers, is shown as mounted in a central vertical spindle, as will be readily understood.

After the lining has been tamped in the manner before described, the holes are formed therein by the means more clearly illustrated in Figs. 2 and 3. Beneath one part of the table is a pricking apparatus, (as shown in Fig. 3,) which consists of a vertical hydraulic or other pressure-cylinder, G, containing a piston, $g$, whose piston-rod carries at its upper end a head, H, having a suitable number of needles, $h$. The table D, as shown in Fig. 3, is open in the center, and the bottom of the converter has openings corresponding with those to be formed in the lining. When the table has been brought in its rotary movement to a proper position over the perforating apparatus, its motion is arrested and the head H, with its needles, forced upward through the lining in the converter-bottom. Then the table and converter-bottom are turned a part of a revolution for the formation of the next set of holes, and so on until all the openings necessary have been formed.

In order to support the table and converter-bottom against the pressure of the perforating apparatus, a perforated plate is laid on the top of the round bottom, and this, together with the bottom and table, is held by a strong yoke, Y, which is hinged at $y$ to a suitable anchorage and then put over the top of the converter, as shown in Fig. 3.

When the converter-bottom to be lined is already provided with tuyeres, I prefer to use the modified form of apparatus illustrated in Figs. 5 and 6, in which the reciprocating tamping-tool is, as before described, carried by a swinging crane adapted to be raised or lowered vertically, and the tool-cylinder is adapted to be turned on the horizontal axis before described, and in addition in this case, to get a further freedom of movement to allow the tool to travel closely around the tuyeres, I provide a vertical hinge, $a^2$, in addition to the horizontal one $a$. The table in this case is mounted on four rollers, $d$, as before described; but the devices for imparting motion to the table are somewhat different. This is obtained through the medium of two of the rollers on which the table is mounted, the axes of these rollers being provided with pinions $e$, and into these pinions gear racks L, carried by a cross-head, L', Fig. 6, guided on horizontal guide-bars $l'$.

The cross-head L', carrying the racks, may be traversed backward and forward in the pit the length of the stroke by means of a piston, $q$, having its rods connected to the cross-head and traversing the cylinder $q'$, operated by steam, hydraulic, or other pressure in any suitable manner. By these devices a rotary motion to the extent of a little over one revolution in either direction may be imparted to the table and the cylinder.

For tamping the lining of the body of the converter, I construct my apparatus as illustrated in Fig. 7, in which duplicate reciprocating tamping-tools A are shown. These tamping-tools A are mounted in arms B', corresponding with the crane before described. These arms have their inner ends forked, and the forked ends are adapted to and secured in sockets $v$ $v'$, Fig. 8, which are threaded and adapted to a corresponding thread on a vertical stem, F², fixed rigidly in the converter. Thus the arms carrying the reciprocating tamping-tools are turned on this vertical shaft F²; but at the same time this turning motion will, by the threading of the sockets of the shaft, cause the arms with their reciprocating tamping-tools to be raised or lowered according to the direction in which they are turned. In order to afford convenient means for turning these arms on the said shaft and a convenient standing-place for the operator within the body of the converter, I connect to the lower of the sockets, $v'$, a hollow sleeve, $n$, carrying at its lower end arms $n'$, for the reception of boards or planking to form a platform for the operator to stand upon. To prevent this sleeve from turning it is provided with keys $y'$, adapted to opposite longitudinal grooves, $u$, in the shaft, as illustrated in Fig. 9.

In using this apparatus lining-plates $m$ are used as the material is introduced, and the tamping-tools can have a swinging motion between the interior lining-plates and the exterior shell by swinging on their horizontal pivots in the arms $B'$, and at the same time they can be traversed in a circular path around the inside of the converter upon the spindle-shaft.

Although I have shown two tamping-tools as used in the body of the converter in order that the work may progress more rapidly, either one or more than two may be used.

Instead of threading the shaft and elevating the tamping-tools by that means, the two sockets $v\ v'$, which carry the arms, may be mounted on a sleeve, $w$, Fig. 10, which is secured to the spindle, and the spindle itself may be raised as the work progresses by a block and tackle.

For tamping the inclined part of the body of the converter near the mouth, the shaft which carries the tamping-tools will have to be temporarily arranged at an angle.

I claim as my invention—

1. The herein-described apparatus for forming linings for converters or converter-bottoms, said apparatus consisting of a movable arm or crane and a reciprocating tamping-tool pivoted thereto, substantially as described.

2. The herein-described apparatus for forming linings for converters and converter-bottoms, said apparatus consisting of a shaft or spindle, an arm or crane vertically adjustable and free to turn thereon, and carrying a reciprocating tamping-tool.

3. The combination of a rotary table, adapted to receive a converter-bottom, with a vertically-adjustable swinging crane carrying a reciprocating tamping-tool, substantially as set forth.

4. The combination of the rotary table, adapted to receive the converter-bottom, with a hollow vertical shaft and a swinging crane carrying a reciprocating tamping-tool, and having its upper socket a closed cylinder, in which the upper end of said shaft or spindle can work, substantially as set forth.

5. The combination of a crane carrying a reciprocating tamping-tool with a rotary table adapted to receive a converter-bottom, and variable-speed driving mechanism for the table, substantially as set forth.

6. The combination of a movable arm or crane, and a reciprocating tamping-tool pivoted thereto, with a rotary table adapted to receive a converter-bottom.

In testimony whereof I have signed my name to this specification in the presence of two subscribing witnesses.

BRUNO VERSEN.

Witnesses:
 GEO. KOCH,
 ED. KIRCHNER.